(12) United States Patent
Miller et al.

(10) Patent No.: US 11,455,191 B2
(45) Date of Patent: Sep. 27, 2022

(54) PARALLEL TASK INITIALIZATION ON DYNAMIC COMPUTE RESOURCES

(71) Applicant: International Business Machines Corporation, Armonk, NY (US)

(72) Inventors: Scott Miller, Poughkeepsie, NY (US); Austen William Lauria, Fishkill, NY (US); Sameh Sherif Sharkawi, Cypress, TX (US); William P. LePera, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 17/069,554

(22) Filed: Oct. 13, 2020

(65) Prior Publication Data
US 2022/0114024 A1  Apr. 14, 2022

(51) Int. Cl.
*G06F 9/50* (2006.01)
*G06F 9/48* (2006.01)

(52) U.S. Cl.
CPC .............. *G06F 9/50* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,279,025 B1 | 8/2001 | Yamamoto et al. | |
| 7,505,891 B2 * | 3/2009 | Lin | G06F 30/33 703/27 |
| 7,810,093 B2 | 10/2010 | Jones et al. | |
| 8,413,153 B2 | 4/2013 | Harris et al. | |
| 8,719,804 B2 * | 5/2014 | Jain | G06F 11/3495 717/127 |
| 8,898,434 B2 * | 11/2014 | Merchant | G06F 11/3466 712/205 |

(Continued)

FOREIGN PATENT DOCUMENTS

| | | |
|---|---|---|
| CN | 104793996 A | 7/2015 |
| CN | 109408286 A | 3/2019 |
| EP | 1318453 A1 | 6/2003 |

OTHER PUBLICATIONS

Rana et al. "Resource Discovery for Dynamic Clusters in Computational Grid", 2001 IEEE, 9 pages.*

(Continued)

*Primary Examiner* — Van H Nguyen
(74) *Attorney, Agent, or Firm* — Garg Law Firm, PLLC; Rakesh Garg; Nathan Rau

(57) ABSTRACT

On a first compute resource, execution of a first task is triggered, execution of a portion of the first task being conditioned on a second task executing on a second compute resource. A state indicator of the second task is monitored, the state indicator indicating whether or not the second task is currently executing on the second compute resource. Responsive to the state indicator indicating that the second task is not currently executing, execution of the portion of the first task is suspended. A change in the state indicator is determined to have occurred. Responsive to the determining, received connection information for the second task is forwarded to the first task. Execution of the portion of the first task is re-triggered on the first compute resource.

15 Claims, 10 Drawing Sheets

(56) References Cited

U.S. PATENT DOCUMENTS

| | | |
|---|---|---|
| 9,588,818 B2 | 3/2017 | Iwata |
| 10,193,762 B2* | 1/2019 | Poort ...................... H04L 67/10 |
| 10,698,935 B2* | 6/2020 | Stevens .............. G06Q 30/0201 |
| 2003/0120708 A1 | 6/2003 | Pulsipher et al. |
| 2009/0025004 A1 | 1/2009 | Barnard et al. |
| 2017/0109217 A1 | 4/2017 | Raman et al. |
| 2020/0026580 A1 | 1/2020 | Bahramshahry et al. |

OTHER PUBLICATIONS

Wang et al. "Improving Utilization through Dynamic VM Resource Allocation in Hybrid Cloud Environment", 2014 IEEE, 8 pages.*
Singh et al., Task scheduling in cluster computing environment, 2015 1st International Conference on Futuristic trend in Computational Analysis and Knowledge Management (ABLAZE-2015), Jul. 2015.
International Searching Authority, PCT/CN2021/123260, dated Jan. 13, 2022.

* cited by examiner

PARALLEL TASK INITIALIZATION ON DYNAMIC COMPUTE RESOURCES

BACKGROUND

The present invention relates generally to a method, system, and computer program product for use of dynamic compute resources. More particularly, the present invention relates to a method, system, and computer program product for parallel task initialization on dynamic compute resources.

A compute resource provides a data processing capability. Some non-limiting examples of a compute resource are a physical computer system, a virtual machine (VM) or logical partition virtualizing a physical computer system, a container executing on a VM, a virtual or physical cluster of computer systems, and a virtual or physical resource pool.

Computing environments often include multiple compute resources and the software executing on the resources. In computer system administration, orchestration is the automated configuration, coordination, and management of computer systems and software. Orchestration typically automates a process or workflow that involves many steps across multiple disparate systems. An orchestration framework is a software tool that performs orchestration. One function of an orchestration framework is to configure and provide compute resources for use as the resources are needed, and to remove or reconfigure compute resources once they are no longer needed. Reconfigurable compute resources that are provided upon request are also call dynamic compute resources. Kubernetes is a non-limiting example of an orchestration framework; other orchestration frameworks are also presently available. (Kubernetes is a registered trademark of the Linux Foundation in the United States and other countries.)

A job is a unit of data processing work. Jobs are often executed using parallel processing, in which portions of a job are distributed among multiple compute resources for execution in parallel with each other. A task is a single program instance, executing on a single compute resource. Thus, a job executes as a plurality of tasks. During execution of a job, tasks communicate status and processed data with each other. Message Passing Interface (MPI) and Process Management Interface-eXascale (PMIx) are two non-limiting examples of interfaces by which tasks communicate with each other; other task communication interfaces are also presently available.

A process manager manages tasks within a job, including initializing tasks on compute resources and forwarding communications information between tasks. In some implementations, a local process manager manages tasks executing on a particular compute resource, while a root process manager manages one or more local process managers, each managing tasks executing on a different compute resource. The root process manager and the one or more local process managers form a process manager network. Process managers within the process manager network communicate with each other.

SUMMARY

The illustrative embodiments provide a method, system, and computer program product. An embodiment includes a method that triggers, on a first compute resource, execution of a first task, wherein execution of a portion of the first task is conditioned on a second task executing on a second compute resource. An embodiment monitors a state indicator of the second task, the state indicator indicating whether or not the second task is currently executing on the second compute resource. An embodiment suspends, responsive to the state indicator indicating that the second task is not currently executing, execution of the portion of the first task. An embodiment determines that a change in the state indicator has occurred. An embodiment forwards, to the first task responsive to the determining, received connection information for the second task. An embodiment re-triggers, on the first compute resource, execution of the portion of the first task.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
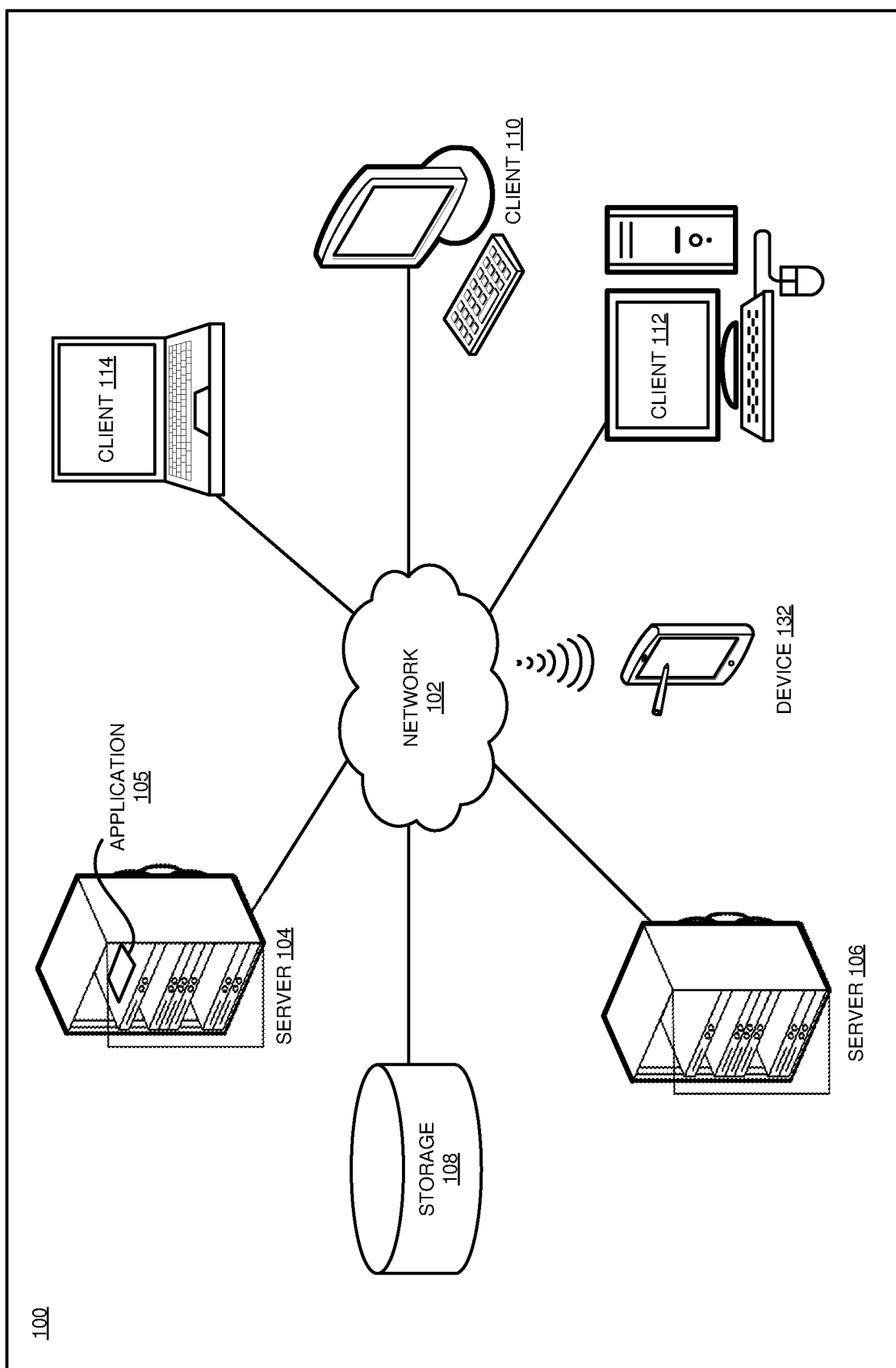
FIG. 1 depicts a block diagram of a network of data processing systems in which illustrative embodiments may be implemented.

The illustrative embodiments recognize that, presently, an orchestration framework schedules a job for execution and assigns compute resources to the job. In a data processing environment in which compute resources are configured and made available only when needed, compute resources that are assigned to a scheduled job may need to be configured and initialized before being used for task execution. Once all the assigned compute resources are ready for task execution, tasks are started on each compute resource. The tasks execute in parallel and communicate with each other. The illustrative embodiments also recognize that, the more compute resources that are required to execute a job, the longer the wait until all compute resources are available and job execution actually begins. Consequently, there is a need to shorten the time between scheduling a job for execution and when job execution actually begins on assigned compute resources.

The illustrative embodiments recognize that the presently available tools or solutions do not address these needs or provide adequate solutions for these needs. The illustrative embodiments used to describe the invention generally address and solve the above-described problems and other problems related to for parallel task initialization on dynamic compute resources.

An embodiment can be implemented as a software application. The application implementing an embodiment can be configured as a modification of an existing process manager, as a separate application that operates in conjunction with an existing process manager, a standalone application, or some combination thereof.

Particularly, some illustrative embodiments provide a method that triggers execution of a first task on a first compute resource without waiting for a second task to begin executing on a second compute resource, and monitors an execution status of the second task. When execution of the first task reaches a portion that is conditional on the second task executing, the first task waits if necessary until the second task is executing, then continues execution.

To begin, an orchestration framework schedules a job for execution, assigns a set of compute resources to the job, and forwards data about the job and the assigned set of compute resources to a root process manager. In a data processing environment in which compute resources are configured and made available only when needed, the assigned compute resources may need to be configured and initialized before being used for task execution. Thus, an orchestration framework configures and initializes compute resources that are assigned to a job, and notifies an embodiment implemented in a root process manager when each compute resource is available for task execution within the job.

An embodiment implemented in a root process manager receives an event notification that a compute resource is available for task execution. In one embodiment, the root process manager subscribes to compute resource discovery events, by notifying the orchestration framework of the particular type of event the root process manager should be notified of. Another embodiment does not employ a subscription implementation, and instead the root process manager receives broadcast notifications of the availability of an assigned compute resource. Another embodiment receives compute resource notifications from a source other than an orchestration framework.

When an embodiment implemented in a root process manager receives an event notification that a compute resource is available for task execution, the embodiment spawns a local process manager on the newly-available compute resource and provides connection information for tasks that are part of the current job and that are already executing on other compute resources. In embodiments, connection information for task differs depending on the networking environment and other factors. As one non-limiting example, in an InfiniBand network, task connection information between two tasks includes a queue pair (a communications endpoint) and a local ID (an assigned device identifier). (InfiniBand is a registered trademark of System I/O, Inc. in the United States and other countries.) Availability of connection information for a particular task serves as a state indicator that the task is currently executing on a compute resource. Conversely, absence of connection information for a particular task serves as a state indicator that the task is not currently executing on a compute resource An embodiment implemented in a newly spawned local process manager on a newly-available compute resource triggers at least one local task for execution. The embodiment provides connection information for tasks that are already executing on other compute resources to the local task, and provides connection information for the local tasks to other process managers executing on the other compute resources. As a result, all tasks within the job that are currently executing are able to use the connection information to communicate data with each other.

At a later time during compute resource configuration, an embodiment implemented in a root process manager receives an event notification that a new compute resource is available for task execution and spawns a second local process manager on the new compute resource. The second local process manager provides task connection information for its local tasks to the process manager network, including the first local process manager. Thus, the task executing on the first compute resource is able to communicate data with tasks now executing on the new compute resource. As a result, the task executing on the first compute resource did not have to wait for the new compute resource to be made available before beginning execution, reducing overall job initialization time.

At a later time during compute resource configuration, the task executing on the first compute resource requires communication with a third task to continue execution. If the first task has communication information for the third task, the third task is executing on a compute resource (local or remote) and is able to communicate with the first task. Thus, the first task continues to execute. If, on the other hand, the first task does not have communication information for the third task, the third task is not yet executing on a compute resource and is not able to communicate with the first task. As a result, the first task suspends execution. Then, at a later time during compute resource configuration, an embodiment implemented in a root process manager receives an event notification that a third new compute resource is available for task execution and spawns a third local process manager on the third compute resource. The third local process manager provides task connection information for its local tasks, including the third task for which the first task is waiting, to the process manager network. The first local process manager receives communication information for the third task and forwards the information to the first task, retriggering execution of the first task now that the third task is available. As a result, while the task executing on the first compute resource had to wait for the third new compute resource to be made available before continuing execution, the first task was able to perform some processing, reducing overall job initialization time.

At a later time during compute resource configuration, the task executing on the first compute resource requires communication with a fourth task to continue execution. If the first task has communication information for the fourth task, the first task continues to execute. If, on the other hand, the first task does not have communication information for the fourth task, the fourth task is not yet executing on a compute resource. As a result, the first task suspends execution until connection information for the fourth task, executing on a fourth compute resource is available. As a result, depending on the needs of the task executing on the first compute resource and the timing of availability of additional compute resources, the task might have to suspend and resume execution zero or more times while waiting for a compute resource to be made available.

The manner of parallel task initialization on dynamic compute resources described herein is unavailable in the presently available methods in the technological field of endeavor pertaining to task and compute resource management. A method of an embodiment described herein, when implemented to execute on a device or data processing system, comprises substantial advancement of the functionality of that device or data processing system in triggering execution of a first task on a first compute resource without waiting for a second task to begin executing on a second compute resource, and monitoring an execution status of the second task. When execution of the first task reaches a portion that is conditional on the second task executing, the first task waits if necessary until the second task is executing, then continues execution.

The illustrative embodiments are described with respect to certain types of compute resources, orchestration frameworks, process managers, jobs, tasks, inter-task communication information, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
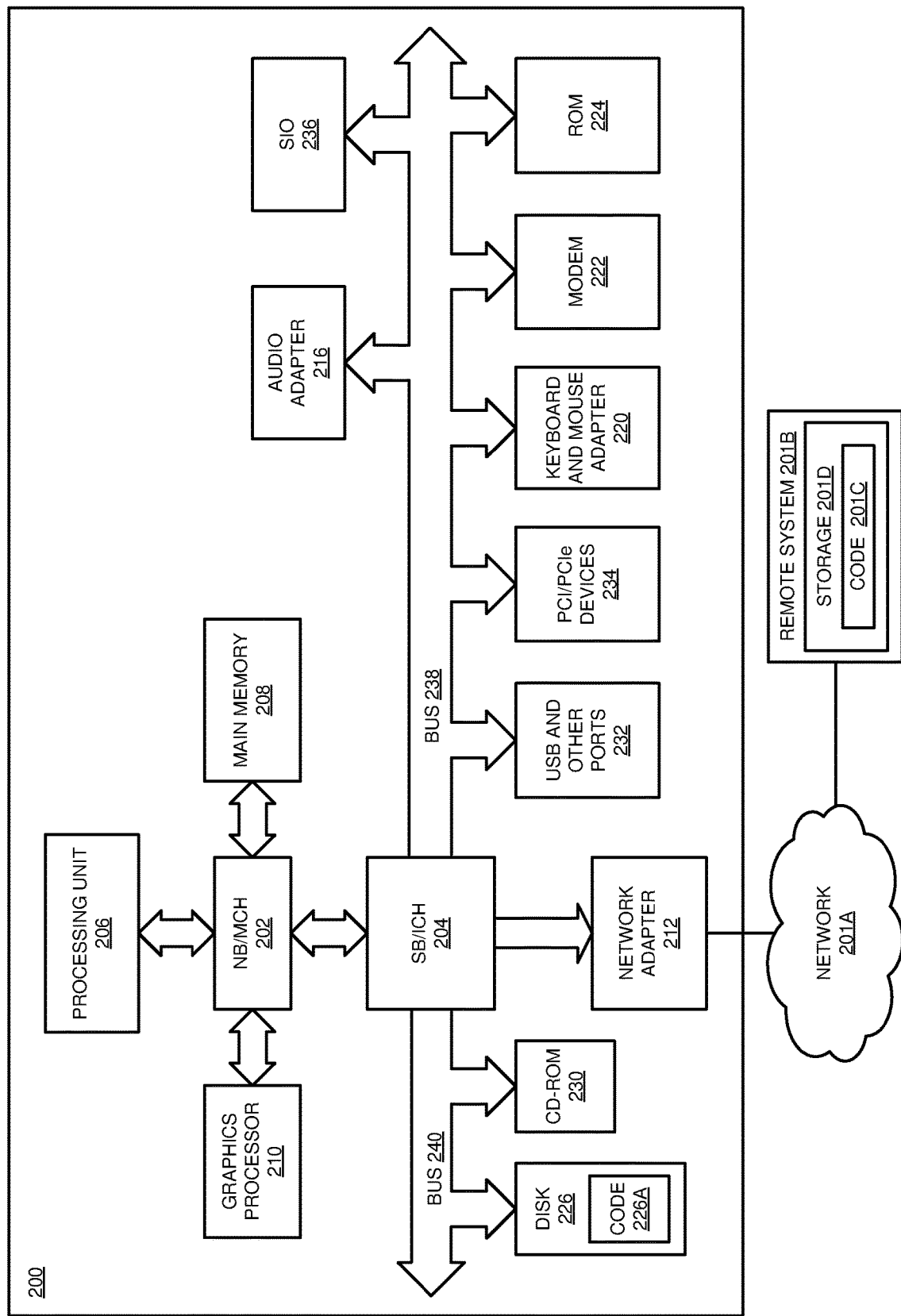
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Portions of application 105 can be implemented within a remote process manager, a local process manager, or a task, and different portions of application 105 can execute in different systems.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
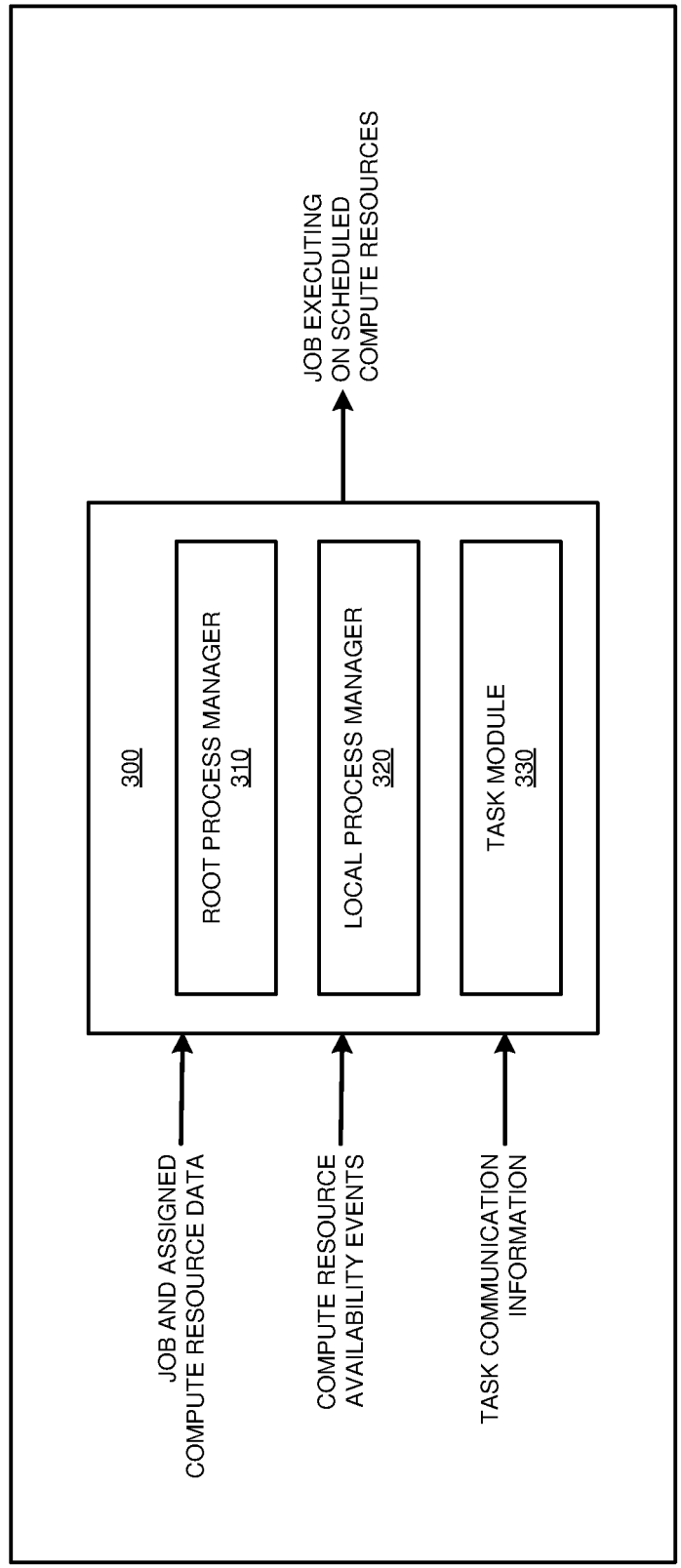
FIG. 3 depicts a block diagram of an example configuration for parallel task initialization on dynamic compute resources in accordance with an illustrative embodiment.

With reference to FIG. 3, this figure depicts a block diagram of an example configuration for parallel task initialization on dynamic compute resources in accordance with an illustrative embodiment. Application 300 is an example of application 105 in FIG. 1 and executes in any of servers 104 and 106, clients 110, 112, and 114, and device 132 in FIG. 1.

Root process manger 310 receives data about a job and the job's assigned set of compute resources from an orchestration framework or another source. As well, root process manager 310 receives an event notification that a compute resource is available for task execution. One implementation of root process manager 310 subscribes to compute resource discovery events, by notifying the orchestration framework or other event source of the particular type of event root process manager 310 should be notified of. Another implementation of root process manager 310 does not employ a subscription implementation, and instead receives broadcast notifications of the availability of an assigned compute resource.

When root process manager 310 receives an event notification that a compute resource is available for task execution, root process manager 310 spawns a local process manager on the newly-available compute resource and provides connection information for tasks that are part of the current job and that are already executing on other compute resources.

Newly spawned local process manager 320, on a newly-available compute resource, triggers at least one local task for execution. Local process manager 320 provides connection information for tasks that are already executing on other compute resources to the local task, and provides connection information for the local tasks to other instances of local process manager 320 and root process manager 310 executing on the other compute resources. As a result, all tasks within the job that are currently executing are able to communicate with each other.

At a later time during compute resource configuration, root process manager 310 receives an event notification that a new compute resource is available for task execution and spawns a second instance of local process manager 320 on the new compute resource. The second instance of local process manager 320 provides task connection information for its local tasks to the process manager network, including the first instance of local process manager 320. Thus, the task executing on the first compute resource is able to communicate with tasks now executing on the new compute resource.

Task module 330 is a task triggered for execution by and managed by local process manager 320. At a later time during compute resource configuration, task module 330, executing on the first compute resource, requires communication with a third task to continue execution. If task module 330 has communication information for the third task, the third task is executing on a compute resource (local or remote) and is able to communicate with task module 330. Thus, task module 330 continues to execute. If, on the other hand, task module 330 does not have communication information for the third task, the third task is not yet executing on a compute resource and is not able to communicate with the first task. As a result, task module 330 suspends execution. Then, a later time during compute resource configuration, root process manager 310 receives an event notification that a third new compute resource is available for task execution and spawns a third instance of local process manager 320 on the third compute resource. The third instance of local process manager 320 provides task connection information for its local tasks, including the third task for which task module 330 is waiting, to the process manager network. The first instance of local process manager 320 receives communication information for the third task and forwards the information to task module 330, retriggering execution of task module 330 now that the third task is available.

Figure 4:
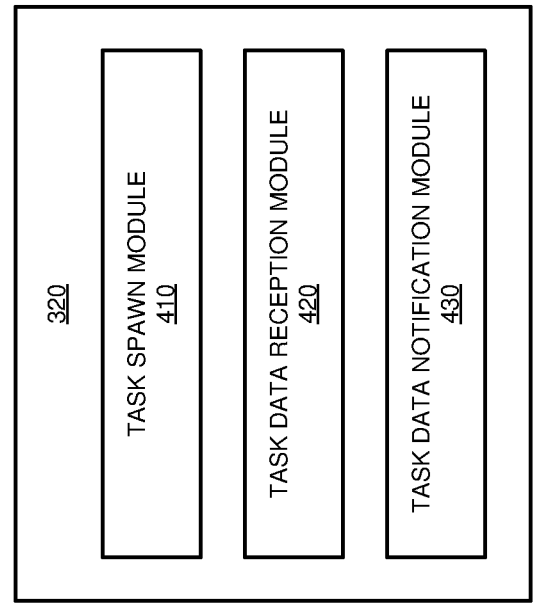
FIG. 4 depicts a block diagram of an example configuration for parallel task initialization on dynamic compute resources in accordance with an illustrative embodiment.

With reference to FIG. 4, this figure depicts a block diagram of an example configuration for parallel task initialization on dynamic compute resources in accordance with an illustrative embodiment. In particular, FIG. 4 depicts more detail of local process manager 320 in FIG. 3.

Within a newly spawned instance of local process manager 320 on a newly-available compute resource, task spawn module 410 triggers at least one local task for execution. Task data reception manager 420 provides connection information for tasks that are already executing on other compute resources to the local task, and task data notification manager 430 provides connection information for the local tasks to other process managers executing on the other compute resources. As a result, all tasks within the job that are currently executing are able to communicate with each other.

Figure 5:
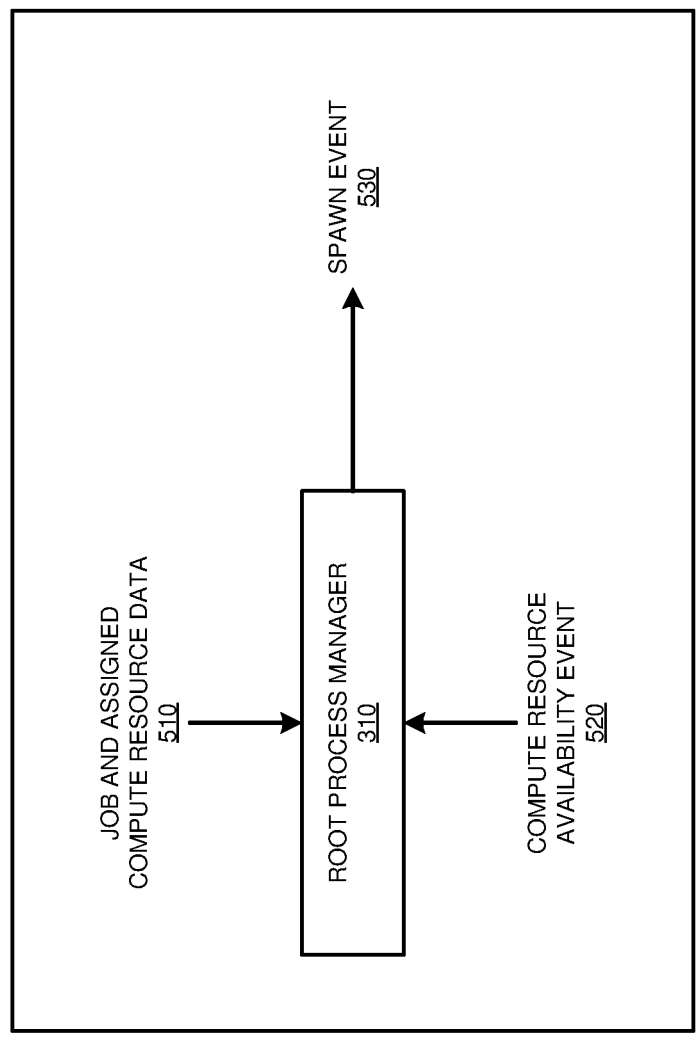
FIG. 5 depicts an example of parallel task initialization on dynamic compute resources in accordance with an illustrative embodiment.

With reference to FIG. 5, this figure depicts an example of parallel task initialization on dynamic compute resources in accordance with an illustrative embodiment. The example can be executed using application 300 in FIG. 3. Root process manager 310 is the same as root process manager 310 in FIG. 3.

Root process manger 310 receives job and assigned compute resource data 510 from an orchestration framework or another source. As well, root process manager 310 receives compute resource availability event 520, indicating that a compute resource is available for task execution.

When root process manager 310 receives event 520, root process manager 310 produces spawn event 530, spawning a local process manager on the newly-available compute resource and providing connection information for tasks that are part of the current job and that are already executing on other compute resources.

Figure 6:
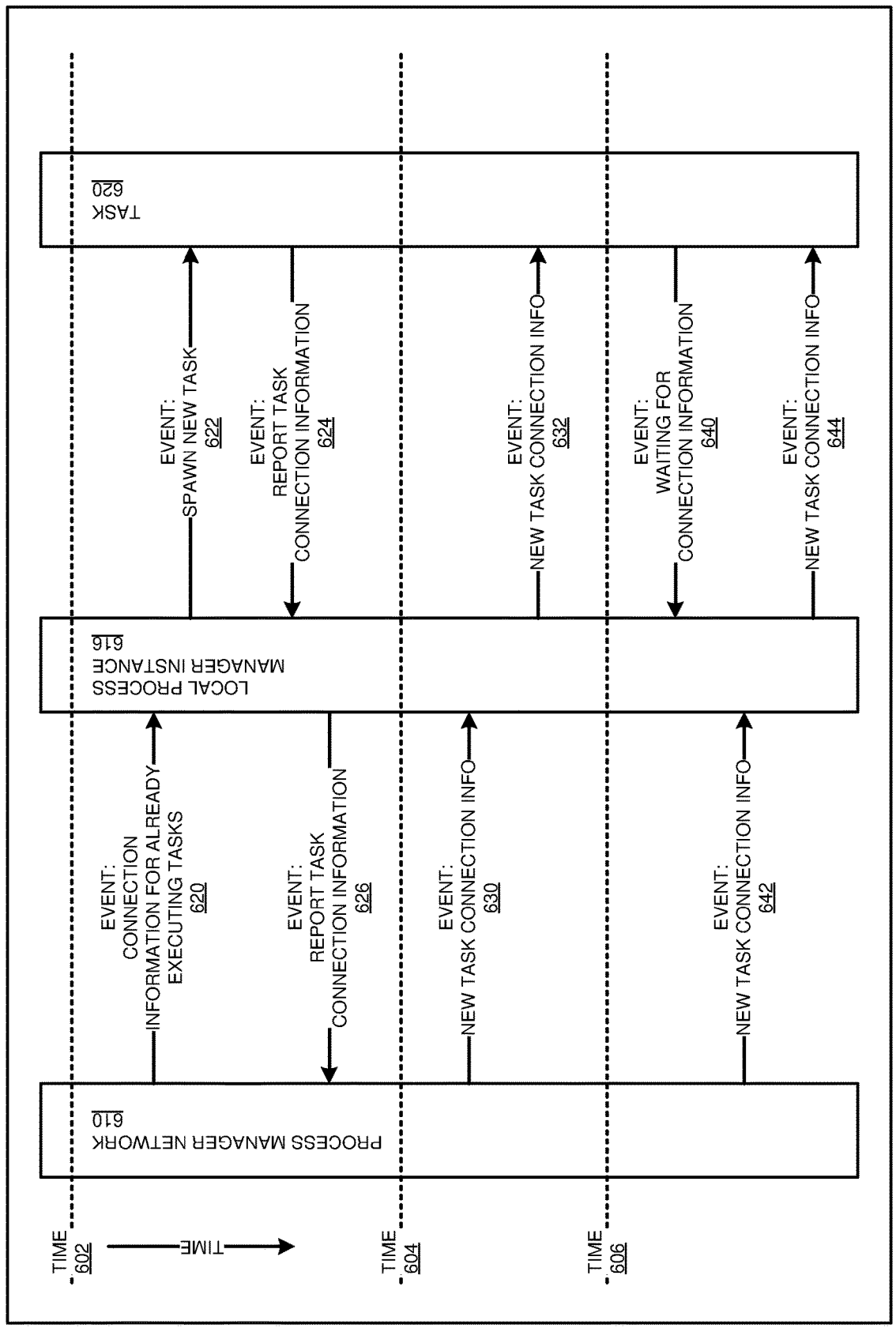
FIG. 6 depicts an example of parallel task initialization on dynamic compute resources in accordance with an illustrative embodiment.

With reference to FIG. 6, this figure depicts an example of parallel task initialization on dynamic compute resources in accordance with an illustrative embodiment. The example can be executed using application 300 in FIG. 3.

At time 602, during compute resource configuration, local process manager instance 616 has just been spawned on a newly-available compute resource. At event 620, connection information for tasks that are part of the current job and that are already executing on other compute resources is passed from process manager network 610 to local process manager instance 616. At event 622, local process manager instance 616 spawns task 620, a local task, triggering task 620 for execution. At event 624, task 620 provides connection information for itself to local process manager instance 616, and at event 626, local process manager instance 616 provides task 620's connection information to process manager network 610 for relay to other process managers executing on the other compute resources. As a result, all tasks within the job that are currently executing are able to communicate with each other.

At time 604, a later time during compute resource configuration, a root process manager receives an event notification that a new compute resource is available for task execution and spawns a second local process manager on the new compute resource. The second local process manager provides task connection information for its local tasks to process manager network 610. At event 630 the new task connection information is provided to local process manager instance 616. At event 632 local process manager instance 616 forwards the new task connection information to task 620. Thus, task 620 is able to communicate with tasks now executing on the new compute resource.

At time 606, a later time during compute resource configuration, task 620 requires communication with a third task to continue execution. If task 620 has communication information for the third task, the third task is executing on a compute resource (local or remote) and is able to communicate with task 620, and task 620 continues to execute. FIG. 6 depicts the alternative, in which task 620 does not have communication information for the third task, because the third task is not yet executing on a compute resource and is not able to communicate with task 620. As a result, at event 640 task 620 suspends execution and reports this to local process manager instance 616. Then, at a later time during compute resource configuration, a third new compute resource becomes available for task execution and a third local process manager is spawned on the third compute resource. The third local process manager provides task connection information for its local tasks, including the third task for which the first task is waiting, to process manager network 610. At event 642, local process manager instance 616 receives communication information for the third task and, at event 644, forwards the information to task 620, retriggering execution of task 620 now that the third task is available.

Figure 7:
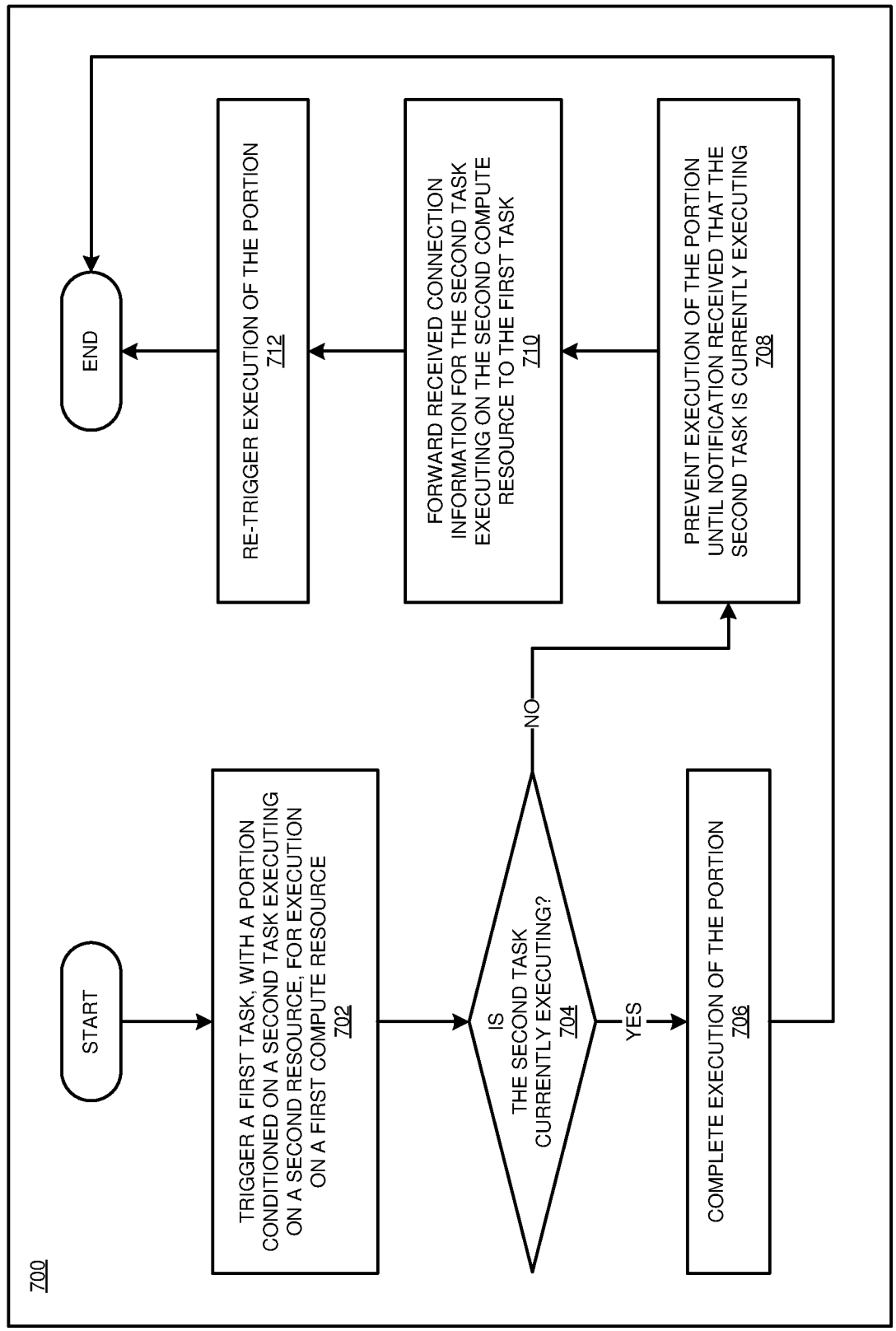
FIG. 7 depicts a flowchart of an example process for parallel task initialization on dynamic compute resources in accordance with an illustrative embodiment.

With reference to FIG. 7, this figure depicts a flowchart of an example process for parallel task initialization on dynamic compute resources in accordance with an illustrative embodiment. Process 700 can be implemented in application 300 in FIG. 3.

In block 702, the application triggers a first task, with a portion conditioned on a second task executing on a second resource, for execution on a first compute resource. In block 704, the application determines whether the second task is currently executing. If so ("YES" path of block 704), in block 706 the application completes execution of the portion, then ends. Otherwise ("NO" path of block 704), in block 708 the application prevents execution of the portion until notification is received that the second task is currently executing. In block 710, the application forwards received connection information for the second task executing on the second compute resource to the first task. In block 712, the application re-triggers execution of the portion. Then the application ends.

Figure 8:
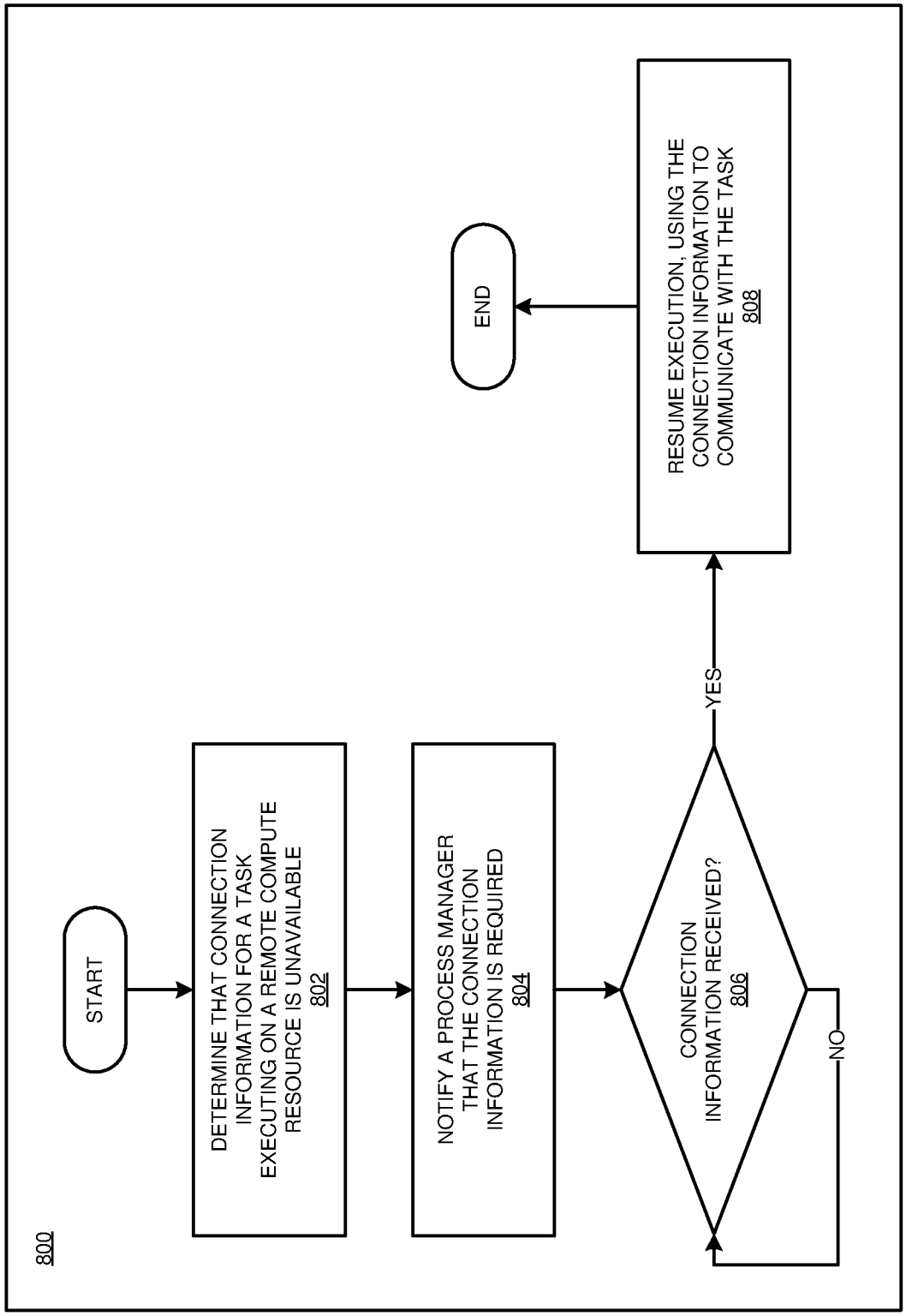
FIG. 8 depicts a flowchart of an example process for parallel task initialization on dynamic compute resources in accordance with an illustrative embodiment.

With reference to FIG. 8, this figure depicts a flowchart of an example process for parallel task initialization on dynamic compute resources in accordance with an illustrative embodiment. Process 800 can be implemented in application 300 in FIG. 3.

In block 802, the application determines that connection information for a task executing on a remote compute resource is unavailable. In block 804, the application notifies a process manager that the connection information is required. In block 806, the application checks whether the connection information has been received. If not ("NO" path of block 806), the application remains at block 806 to wait for the connection information. Otherwise ("YES" path of block 806), in block 808 the application resumes execution, using the connection information to communicate with the task. Then the application ends.

Figure 9:
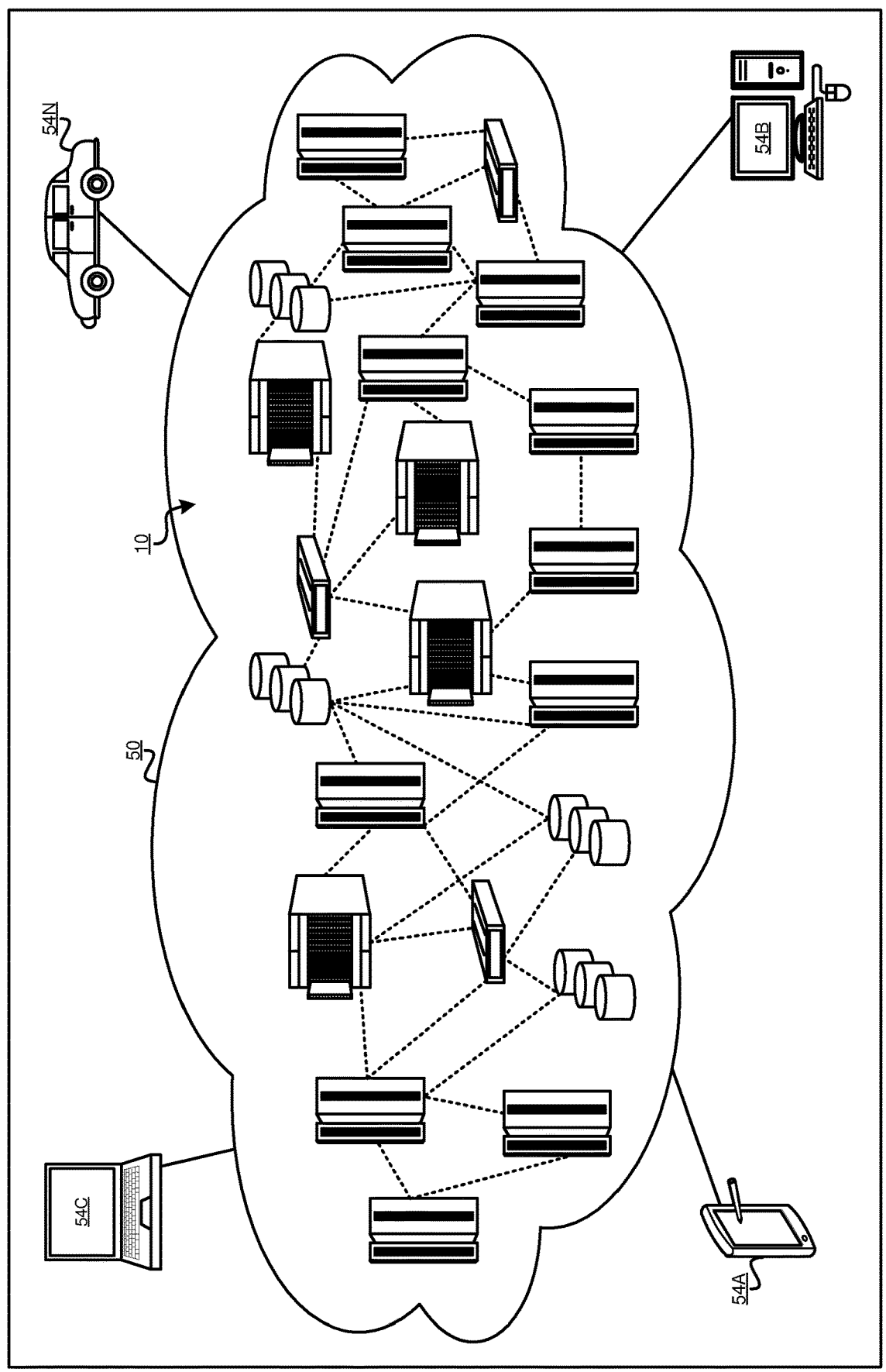
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
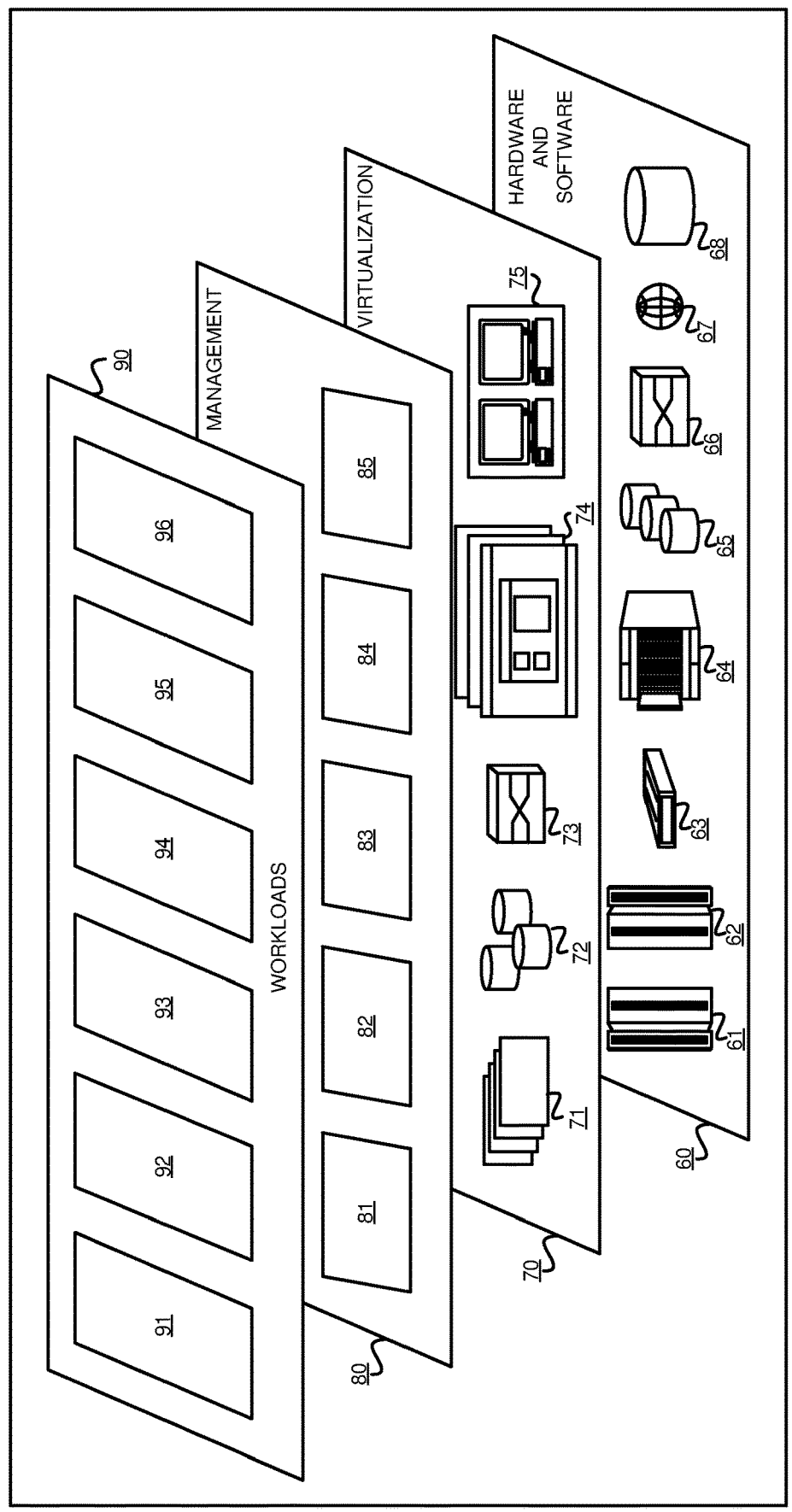
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for parallel task initialization on dynamic compute resources and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   triggering, on a first compute resource, execution of a first task, wherein execution of a portion of the first task is conditioned on a second task executing on a second compute resource, wherein execution of the portion of the first task comprises processing data received from the second task, the data received using received connection information;
   monitoring a state indicator of the second task, the state indicator indicating whether or not the second task is currently executing on the second compute resource, wherein the state indicator comprises the received connection information;
   suspending, responsive to the state indicator indicating that the second task is not currently executing, execution of the portion of the first task;
   determining that a change in the state indicator has occurred;
   forwarding, to the first task responsive to the determining, received connection information for the second task; and
   re-triggering, on the first compute resource, execution of the portion of the first task.

2. The computer-implemented method of claim 1, wherein the monitoring is performed concurrently with the execution of the first task prior to reaching the portion.

3. The computer-implemented method of claim 1, wherein the suspending is performed responsive to receiving a notification that execution of the first task has reached the portion.

4. The computer-implemented method of claim 1, further comprising:
   executing, responsive to the state indicator indicating that the second task is currently executing, the portion of the first task.

5. A computer program product for parallel task initialization on dynamic compute resources, the computer program product comprising:
   one or more computer readable storage media, and program instructions collectively stored on the one or more computer readable storage media, the program instructions comprising:
       program instructions to trigger, on a first compute resource, execution of a first task, wherein execution of a portion of the first task is conditioned on a second task executing on a second compute resource, wherein execution of the portion of the first task comprises processing data received from the second task, the data received using received connection information;
       program instructions to monitor a state indicator of the second task, the state indicator indicating whether or not the second task is currently executing on the second compute resource, wherein the state indicator comprises the received connection information;
       program instructions to suspend, responsive to the state indicator indicating that the second task is not currently executing, execution of the portion of the first task;
       program instructions to determine that a change in the state indicator has occurred;
       program instructions to forward, to the first task responsive to the determining, received connection information for the second task; and
       program instructions to re-trigger, on the first compute resource, execution of the portion of the first task.

6. The computer program product of claim 5, wherein the monitoring is performed concurrently with the execution of the first task prior to reaching the portion.

7. The computer program product of claim 5, wherein the suspending is performed responsive to receiving a notification that execution of the first task has reached the portion.

8. The computer program product of claim 5, further comprising:
   program instructions to execute, responsive to the state indicator indicating that the second task is currently executing, the portion of the first task.

9. The computer program product of claim 5, wherein the stored program instructions are stored in the at least one of the one or more storage media of a local data processing system, and wherein the stored program instructions are transferred over a network from a remote data processing system.

10. The computer program product of claim 5, wherein the stored program instructions are stored in the at least one of the one or more storage media of a server data processing system, and wherein the stored program instructions are downloaded over a network to a remote data processing system for use in a computer readable storage device associated with the remote data processing system.

11. The computer program product of claim 5, wherein the computer program product is provided as a service in a cloud environment.

12. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to trigger, on a first compute resource, execution of a first task, wherein execution of a portion of the first task is conditioned on a second task executing on a second compute resource, wherein execution of the portion of the first task comprises processing data received from the second task, the data received using received connection information;

program instructions to monitor a state indicator of the second task, the state indicator indicating whether or not the second task is currently executing on the second compute resource, wherein the state indicator comprises the received connection information;

program instructions to suspend, responsive to the state indicator indicating that the second task is not currently executing, execution of the portion of the first task;

program instructions to determine that a change in the state indicator has occurred;

program instructions to forward, to the first task responsive to the determining, received connection information for the second task; and program instructions to re-trigger, on the first compute resource, execution of the portion of the first task.

13. The computer system of claim 12, wherein the monitoring is performed concurrently with the execution of the first task prior to reaching the portion.

14. The computer system of claim 12, wherein the suspending is performed responsive to receiving a notification that execution of the first task has reached the portion.

15. The computer system of claim 12, further comprising:

program instructions to execute, responsive to the state indicator indicating that the second task is currently executing, the portion of the first task.

\* \* \* \* \*